No. 871,237. PATENTED NOV. 19, 1907.
D. ROBINSON.
SHOCK ABSORBER FOR VEHICLES.
APPLICATION FILED DEC. 12, 1906.

Witnesses
H. B. Davis
Cynthia Doyle

Inventor:
Duncan Robinson
by Ayres & Harriman
Attys.

UNITED STATES PATENT OFFICE.

DUNCAN ROBINSON, OF BROOKLINE, MASSACHUSETTS.

SHOCK-ABSORBER FOR VEHICLES.

No. 871,237.     Specification of Letters Patent.     Patented Nov. 19, 1907.

Application filed December 12, 1906. Serial No. 347,458.

To all whom it may concern:

Be it known that I, DUNCAN ROBINSON, of Brookline, county of Norfolk, State of Massachusetts, have invented an Improvement in Shock-Absorbers for Vehicles, of which the following description, in connection with the accompanying drawings, is a specification, like characters on the drawings representing like parts.

This invention relates to controlling devices for spring supported vehicles, ordinarily termed shock-absorbers, and has for its object to construct a simple, strong and durable device, which may be easily applied to automobiles, and which will operate to take up or absorb the shocks due to the vehicle passing over the rises and hollows of an irregularly surfaced road.

My invention comprises essentially a circularly movable spring-controlled ring, which is connected in a stationary manner with the running-gear, or to some part or member which is connected with the running-gear, and is also connected with the body, so that it will be turned by the up and down movements of the body, relative to the running-gear, against the action of its controlling springs, whereby both up and down movements of the body are restrained.

Figure 1:
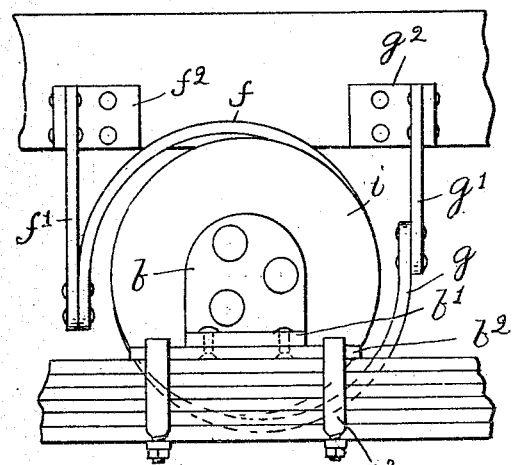
Figure 2:
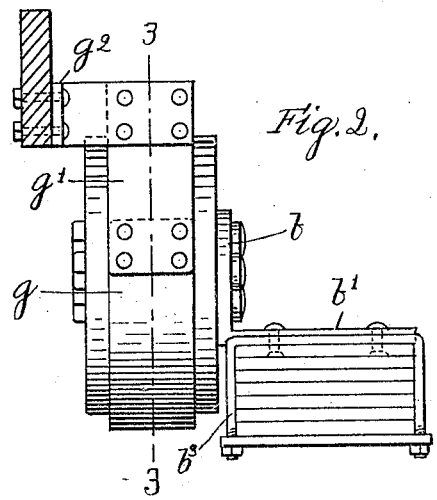
Figure 3:
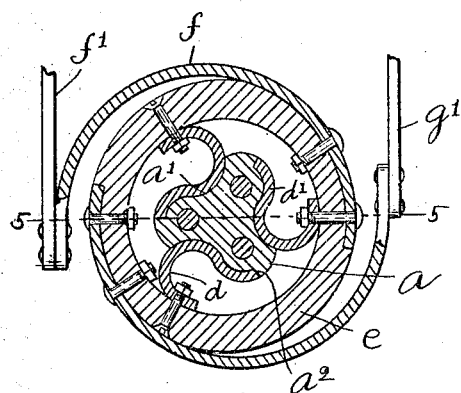
Figure 4:
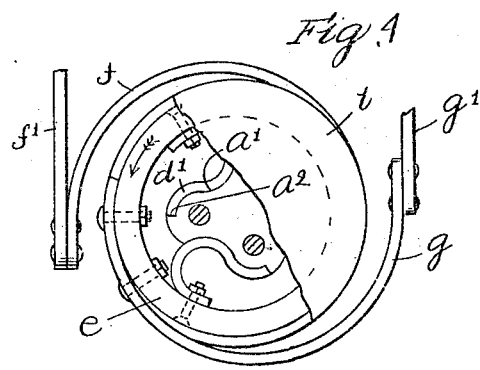
Figure 5:
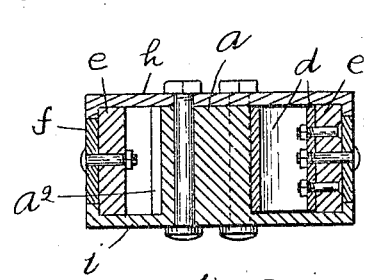
Figure 6:
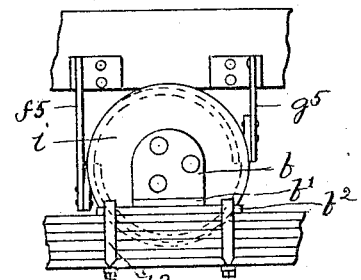

Figure 1 shows in side elevation a shock-absorber embodying this invention. Fig. 2 is a front elevation of the shock-absorber shown in Fig. 1. Fig. 3 is a vertical section of the shock-absorber shown in Fig. 2, taken on the dotted line 3—3. Fig. 4 is a side view of the shock-absorber removed, the end plate being broken away. Fig. 5 is a horizontal section of the shock-absorber shown in Fig. 3, taken on the dotted line 5—5. Fig. 6 is a modification to be referred to.

$a$ represents a stationarily supported hub, which is herein shown as a triangularly shaped block, although it may be of any other shape, bolted or otherwise secured to one arm $b$ of a bracket, the other arm $b'$ of which is rigidly connected with one of the springs of the vehicle, or, as far as my invention is concerned, it may be connected to any other part of or member which is connected with the running-gear, and which is independent of the vehicle body, the spring being merely selected for convenience. The arm $b'$ herein shown is bolted to a plate $b^2$, adapted to be placed on the spring and to be held securely thereon by clips $b^3$.

A plurality of C-springs $d$ are placed in engagement with the block $a$, which are radially disposed with respect thereto, three such springs being herein shown. The edge of the block $a$ is formed with curved seats $a'$ for the springs and with shoulders $a^2$, against which the ends of extensions $d'$ of said springs abut.

The block $a$ and springs $d$ are inclosed in a circularly movable ring $e$, and the outer ends of the springs $d$ are securely fastened to said ring, so that the ring is supported by said springs. It is designed and intended that the ring $e$ shall be turned in the same direction, against the action of said springs $d$, to resist both the up and down movements of the body relative to the running-gear, due to the passage of the vehicle over the rises and hollows of the road, so that said springs shall control the circular movement of the ring as well as support it, but as the essential function of said springs is to control the circular movement of the ring it is immaterial how said ring is supported, whether by the springs or otherwise.

For simplicity of construction I prefer to arrange the springs as shown, to both support the ring and control its circular movement. To accomplish this result two volute springs $f$ and $g$ are attached at one end to the ring $e$ and at their opposite ends to depending brackets or arms on the body, see Figs. 1 to 5, or in lieu thereof straps $f^5$, $g^5$, may be employed, see Fig. 6. The points of attachment of the two volute springs are at opposite sides of the center of the ring $e$, and both extend partially around the ring, so that one of them, as $f$, extends over the top of the ring $e$, and the other, as $g$ extends under the bottom of the ring $e$, and when thus disposed, relative to the ring $e$, the outer end of the spring $f$ extends downward and the outer end of the spring $g$ extends upward.

The outer end of the spring $f$ is rigidly attached to the lower end of an arm $f'$, which is bolted or otherwise secured to a bracket $f^2$ on the body, and the outer end of the spring $g$ is rigidly attached to the lower end of an arm $g'$, which is bolted or otherwise secured to a bracket $g^2$ on the body. The operation of the device is as follows. When the body of the vehicle suddenly drops the spring $f$ is compressed and acts to turn the ring $e$ in the direction of the arrow thereon, against the action of the springs $d$, the spring $g$ at such time expanding or moving away from the ring $e$; and when the body suddenly rises the spring $g$ is compressed and acts to turn the ring $e$ in the same direction, against the action of said springs $d$, the spring $f$ at such time expanding or moving away from the ring $e$.

The outer face of the ring $e$ is cut away or formed to provide for the attachment of the volute springs $f$ and $g$, and yet maintain its circular formation, so that circular end plates $h$ and $i$ may be placed upon the opposite sides of the ring to inclose the operating parts.

As herein shown the circular plate $i$ is formed integral with the hub $a$, for simplicity of construction, but it is obvious that it may be made as a separate plate, in which case the hub and plate will be rigidly secured to the arm $b$ by the same bolts.

Having thus described my invention, what I claim as new and desire to secure by Letters Patent is:—

1. In a shock absorber for vehicles, the combination of a circularly movable spring controlled ring connected with the running-gear, a pair of volute springs attached thereto at opposite sides of its center, and means connecting the outer ends of said springs with the vehicle body, substantially as described.

2. In a shock absorber for vehicles, the combination of a hub connected with the running-gear, a plurality of radially disposed springs engaging it, a circularly movable ring inclosing said hub and springs, to which the outer ends of said springs are attached, a pair of volute springs attached to said ring at opposite sides of its center and means connecting the outer ends of said volute springs with the vehicle body, substantially as described.

3. In a shock absorber for vehicles, the combination of a stationarily supported hub connected with the running-gear and having a plurality of seats and shoulders, a plurality of C-springs fitting said seats having extensions abutting against said shoulders, a circularly movable ring inclosing said hub and springs, to which the outer ends of said springs are attached, a pair of volute springs attached at their inner ends to said ring at opposite sides of its center, and means for connecting the outer ends of said volute springs with the vehicle body, substantially as described.

4. In a shock absorber for vehicles, the combination of a non-rotating hub connected with the running-gear, a plurality of springs engaging it, a circularly movable ring to which the outer ends of said springs are attached, and means connected with the vehicle body and operated by both the up and down movements thereof, relative to its running-gear, for turning said ring in the same direction from its normal position against the action of said springs, substantially as described.

5. In a shock absorber for vehicles, the combination of a circularly movable spring-controlled ring connected with the running-gear, and means operated by both the up and down movements of the vehicle body, relative to its running-gear, for turning said ring in the same direction from its normal position against the action of its controlling springs, substantially as described.

6. In a shock absorber for vehicles, the combination of a circularly movable ring, springs connected with the running-gear and with said ring for supporting said ring and also for controlling its circular movement, and means operated by both the up and down movements of the vehicle, relative to its running gear, for turning said ring in the same direction from its normal position against the action of said springs, substantially as described.

7. In a shock absorber for vehicles, a circularly movable spring controlled ring and means operated by both the up and down movements of the vehicle body relative to its running gear for turning said ring in the same direction from its normal position against the action of its controlling springs, substantially as described.

8. In a shock absorber for vehicles, a circularly movable ring, a plurality of C-springs controlling it, and means operated by both the up and down movements of the vehicle body relative to its running gear for moving said ring in the same direction from its normal position against the action of said controlling springs, substantially as described.

In testimony whereof, I have signed my name to this specification, in the presence of two subscribing witnesses.

DUNCAN ROBINSON.

Witnesses:
B. J. NOYES,
H. B. DAVIS.